(12) United States Patent
Iwaki et al.

(10) Patent No.: US 12,032,374 B2
(45) Date of Patent: Jul. 9, 2024

(54) UNMANNED DELIVERY MACHINE

(71) Applicant: HONDA MOTOR CO., LTD., Tokyo (JP)

(72) Inventors: Ryohei Iwaki, Wako (JP); Kensaku Yamamoto, Wako (JP); Koichi Ogura, Tokyo (JP); Yusuke Kawada, Wako (JP); Toshikatsu Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 701 days.

(21) Appl. No.: 17/215,105

(22) Filed: Mar. 29, 2021

(65) Prior Publication Data

US 2021/0302961 A1 Sep. 30, 2021

(30) Foreign Application Priority Data

Mar. 31, 2020 (JP) .................................. 2020-061906

(51) Int. Cl.
*G05D 1/00* (2006.01)
*B60K 1/04* (2019.01)
(Continued)

(52) U.S. Cl.
CPC ............ *G05D 1/0088* (2013.01); *B60K 1/04* (2013.01); *B60L 53/62* (2019.02); *B60L 53/80* (2019.02); *B60P 1/6418* (2013.01); *E05F 15/70* (2015.01); *G06Q 10/08355* (2013.01); *B60K 2001/0455* (2013.01); *E05Y 2400/45* (2013.01); *E05Y 2900/531* (2013.01)

(58) Field of Classification Search
CPC .. G05D 1/0088; G05D 1/0274; G05D 1/0282; B60K 1/04; B60K 2001/0455; B60L 53/62; B60L 53/80; B60L 50/50; B60P 1/6418; B60P 3/00; E05F 15/70; E05F 15/77; G06Q 10/08355; G06Q 10/083; G06Q 50/40; E05Y 2400/45; E05Y 2900/531; Y02T 10/70; Y02T 10/7072; Y02T 90/12; B62D 33/04
USPC .......................................................... 701/22
See application file for complete search history.

(56) References Cited

U.S. PATENT DOCUMENTS

2019/0220811 A1 7/2019 Naito et al.
2019/0265702 A1* 8/2019 Igata .................... G05D 1/0276
(Continued)

FOREIGN PATENT DOCUMENTS

CN 1980843 6/2007
CN 108973829 12/2018
(Continued)

OTHER PUBLICATIONS

Chinese Office Action for Chinese Patent Application No. 202110326241.5 mailed Nov. 22, 2022.

*Primary Examiner* — Muhammad Shafi
(74) *Attorney, Agent, or Firm* — Amin, Turocy & Watson, LLP

(57) ABSTRACT

An unmanned delivery machine includes a vehicle body that travels autonomously on a road without a driver and a storage device that includes a plurality of storage portions which are closed by a door portion which is able to be opened and closed and that is detachably attached to the vehicle body. The storage device in which luggage is stored in the plurality of storage portions is attached to the vehicle body.

9 Claims, 11 Drawing Sheets

(51) Int. Cl.
  *B60L 53/62* (2019.01)
  *B60L 53/80* (2019.01)
  *B60P 1/64* (2006.01)
  *E05F 15/70* (2015.01)
  *G06Q 10/0835* (2023.01)

(56) References Cited

U.S. PATENT DOCUMENTS

2020/0026281 A1* 1/2020 Xiao ................ G06Q 10/0832
2020/0152068 A1  5/2020 Tang et al.

FOREIGN PATENT DOCUMENTS

| | | | |
|---|---|---|---|
| CN | 109109719 | | 1/2019 |
| CN | 109131925 | | 1/2019 |
| CN | 109196434 | | 1/2019 |
| CN | 109725635 | | 5/2019 |
| CN | 110189066 | | 8/2019 |
| JP | 2006-081300 | * | 3/2006 |
| JP | 2006081300 | * | 3/2006 |
| JP | 2018-058656 | | 4/2018 |
| JP | 2019-131391 | * | 8/2019 |

\* cited by examiner

| USER ID | LUGGAGE ID | CARRY-IN POINT | CARRY-OUT POINT | DESIRED CARRY-IN TIME | LUGGAGE TYPE | STORAGE UNIT DESIGNATION INFORMATION | STORAGE PORTION DESIGNATION INFORMATION | ... |
|---|---|---|---|---|---|---|---|---|
| 0001 | A025 | (, ) | (, ) | 2020/04/30/10:20 | TYPE A | SU1 | CL4 | ... |
| 0002 | A134 | (, ) | (, ) | 2020/05/02/15:00 | TYPE A | SU5 | CR2 | ... |
| 0005 | A002 | (, ) | (, ) | 2020/05/02/14:30 | TYPE B | SU11 | CR1 | ... |
| ... | ... | ... | ... | ... | ... | ... | ... | ... |

| STORAGE UNIT DESIGNATION INFORMATION | STORAGE PORTION DESIGNATION INFORMATION | EVENT (1) | EVENT (2) | EVENT (3) | EVENT (4) | EVENT (5) | ⋮ |
|---|---|---|---|---|---|---|---|
| SU1 | CL1 | CARRIED IN AT 00:00 LUGGAGE ID: A012 | CARRIED OUT AT 00:00 LUGGAGE ID: A012 | | | CARRIED IN AT 00:00 LUGGAGE ID: A658 | ⋮ |
| | ⋮ | ⋮ | ⋮ | ⋮ | ⋮ | ⋮ | ⋮ |
| | CL5 | CARRIED IN AT 00:00 LUGGAGE ID: A264 | — | — | CARRIED OUT AT 00:00 LUGGAGE ID: A264 | — | ⋮ |
| | CR1 | EMPTY | — | CARRIED IN AT 00:00 LUGGAGE ID: A333 | — | — | ⋮ |
| | ⋮ | ⋮ | ⋮ | ⋮ | ⋮ | ⋮ | ⋮ |
| | CR5 | CARRIED IN AT 00:00 LUGGAGE ID: A654 | — | — | — | — | ⋮ |
| | POINT | (∗∗,∗∗) | (∗∗,∗∗) | (∗∗,∗∗) | (∗∗,∗∗) | (∗∗,∗∗) | ⋮ |
| | ROUTE | — | LINK 12, LINK 24, ~ | ~ | ~ | ~ | |

UNMANNED DELIVERY MACHINE

CROSS-REFERENCE TO RELATED APPLICATION

Priority is claimed on Japanese Patent Application No. 2020-061906, filed Mar. 31, 2020, the content of which is incorporated herein by reference.

BACKGROUND OF THE INVENTION

Field of the Invention

The present invention relates to an unmanned delivery machine.

Description of Related Art

A technique of an unmanned delivery system that delivers luggage using an autonomous moving machine that can move autonomously and a server system that operates in association with the autonomous moving machine is known (for example, see Japanese Unexamined Patent Application, First Publication No. 2018-058656).

SUMMARY OF THE INVENTION

In a delivery system, a plurality of pieces of luggage of which delivery has been requested are collected in a luggage collection center, and a process of manually loading the luggage into a predetermined transportation vehicle is performed. In such a luggage loading process, since an operator needs to put much luggage into the predetermined transportation vehicle while ascertaining the luggage piece by piece, the process requires much time. Accordingly, there is demand for enhancement in efficiency of the luggage loading process by accurately and rapidly performing the luggage loading process.

Some aspects of the invention were made in consideration of the aforementioned circumstances and an objective thereof is to provide an unmanned delivery machine that can enhance efficiency of a delivery operation.

In order to solve the aforementioned problems and to achieve the aforementioned objective, the invention employs the following aspects.

(1) According to an aspect of the invention, there is provided an unmanned delivery machine including: a vehicle body that travels autonomously on a road without a driver; and a storage device that includes a plurality of storage portions which are closed by a door portion which is able to be opened and closed and that is detachably attached to the vehicle body, wherein the storage device in which luggage is stored in the plurality of storage portions is attached to the vehicle body.

(2) In the unmanned delivery machine according to the aspect of (1), the vehicle body may include: a travel control unit configured to control autonomous travel of the vehicle body: and a sensor configured to detect information which is required for autonomous travel of the vehicle body.

(3) In the unmanned delivery machine according to the aspect of (1) or (2), the storage device may include an opening/closing mechanism control unit configured to control an opening/closing mechanism of the door portion.

(4) In the unmanned delivery machine according to any one of the aspects of (1) to (3), the storage device may include a first storage portion and a second storage portion which are partitioned from each other, and the door portion may include a first door portion that is provided on a first surface of the storage device and is able to open and close the first storage portion and a second door portion that is provided on a second surface opposite to the first surface of the storage device and is able to open and close the second storage portion.

(5) In the unmanned delivery machine according to the aspect of (4), the storage device may be attached to the vehicle body such that opening/closing operations of the first door portion and the second door portion are not hindered.

(6) In the unmanned delivery machine according to any one of the aspects of (1) to (5), the vehicle body may further include: a power supply unit that supplies driving electric power for autonomous travel of the vehicle body and is able to be detached from the vehicle body: and a power supply control unit configured to determine whether a capacity of the power supply unit is equal to or greater than a capacity required for a delivery process, and the power supply control unit may not perform a process of replacing or charging the power supply unit when it is determined that the capacity of the power supply unit is equal to or greater than the capacity required for the delivery process.

(7) In the unmanned delivery machine according to the aspect of (6), the power supply control unit may perform the process of replacing or charging the power supply unit when it is determined that the capacity of the power supply unit is not equal to or greater than the capacity required for the delivery process.

(8) In the unmanned delivery machine according to any one of the aspects of (1) to (7), the storage device may be detached from the vehicle body after the delivery process has been completed and another storage device with other loaded luggage may be attached to the vehicle body.

(9) In the unmanned delivery machine according to any one of the aspects of (1) to (8), a process of attaching the storage device may be performed in a luggage collection center.

(10) In the unmanned delivery machine according to the aspect of (9), a storage device which is instructed by a management device that manages an operation of the unmanned delivery machine out of a plurality of storage devices with loaded luggage which are disposed in advance in the luggage collection center may be attached to the vehicle body.

According to the aspects of (1) to (10), it is possible to enhance efficiency of a delivery operation. Since the storage device in which luggage is stored in a plurality of storage portions is attached to the vehicle body, it is possible to accurately and rapidly load luggage into the unmanned delivery machine.

According to the aspect of (2), since the control process for delivery is performed on the vehicle side, it is not necessary to perform a process such as calibration of a control system when luggage is replaced.

According to the aspects of (4) and (5), a plurality of storage portions can be used for delivery without hindering the opening/closing operations of the door portions and it is possible to further enhance efficiency of the delivery operation.

According to the aspects of (6) and (7), it is possible to shorten a processing time required for replacing or charging a power supply.

BRIEF DESCRIPTION OF THE DRAWINGS

FIG. 6 is a diagram illustrating an example of details of a request information list 394;

FIG. 7 is a diagram illustrating an example of details of movement schedule information 396;

DETAILED DESCRIPTION OF THE INVENTION

Figure 1:
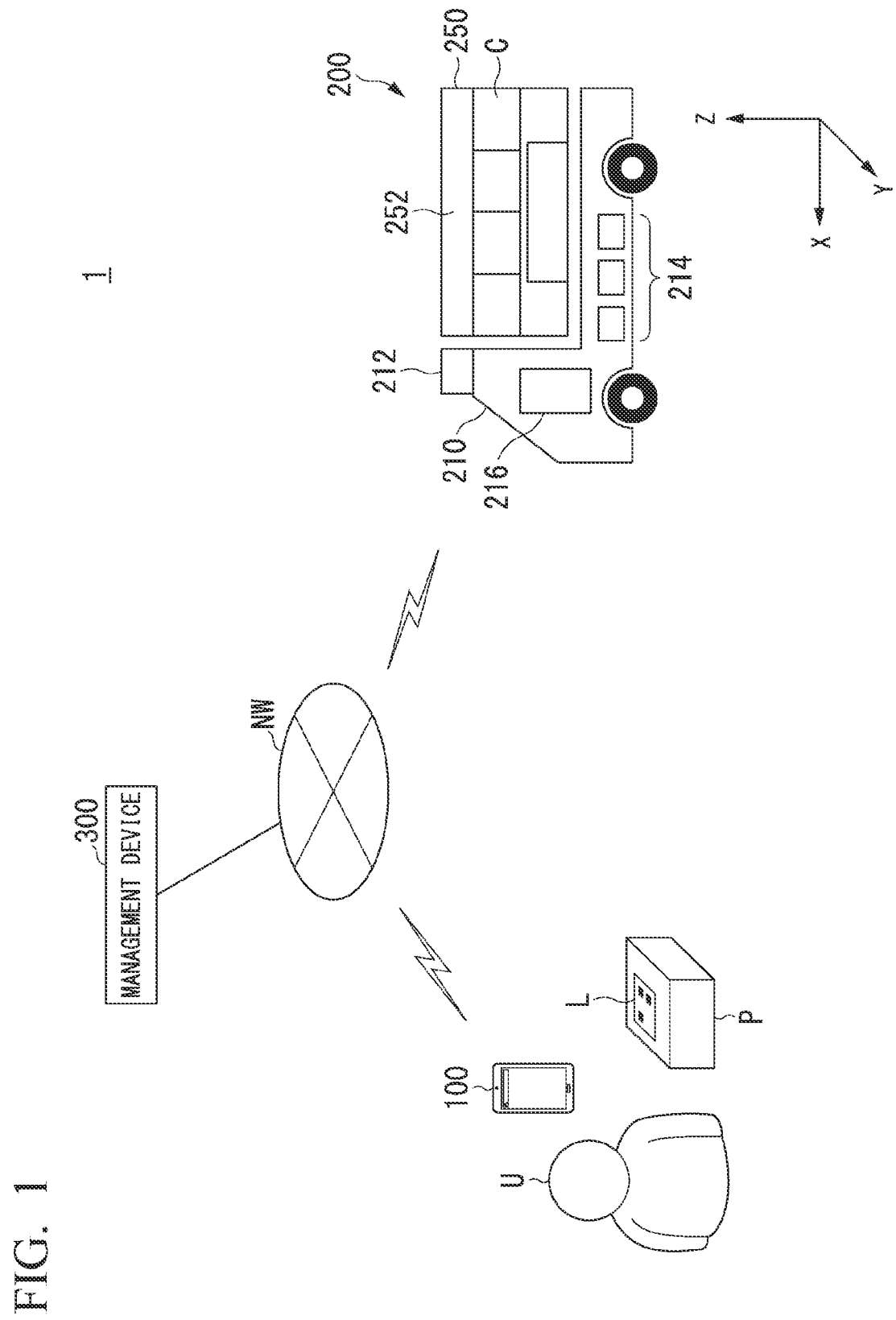
FIG. 1 is a diagram illustrating a configuration of a transportation system 1 including a luggage transportation vehicle 200.

Hereinafter, an unmanned delivery machine and an unmanned delivery system according to an embodiment of the invention will be described with reference to the accompanying drawings. A luggage transportation vehicle which is an example of an unmanned delivery machine includes, for example, a travel unit that can travel autonomously on a road without a driver and a storage unit that is detachably attached to the travel unit. The storage unit includes a plurality of storage portions which are closed by a door which can be opened and closed. The storage unit in which luggage is stored in a plurality of storage portions is attached to the travel unit. In this specification, "attachment" means, for example, that the storage unit is placed on the travel unit and includes a state in which the storage unit is not fixed to the travel unit. Front, rear, right, and left which are mentioned in this specification are defined with respect to a main traveling direction of the luggage transportation vehicle. The travel unit is an example of a "vehicle body." The storage unit is an example of a "storage device."

The travel unit of the luggage transportation vehicle recognizes circumstances outside the vehicle using a monitoring unit such as a camera, a radar device, or a Light Detection and Ranging device (LIDAR), and moves on a road to avoid a road obstacle while traveling along a route instructed by a management device in principle. The travel unit moves on a road at a speed of about 10 [km/h], for example, by causing a motor to drive wheels. For example, the storage unit of the luggage transportation vehicle forms a plurality of luggage storage spaces (storage portions, luggage compartments) which are partitioned from other spaces, and a plurality of users can store (load, carry-in) luggage therein.

The management device manages (controls) the operation of the luggage transportation vehicle. The management device is a device that is placed in a place which is different from that of the luggage transportation vehicle and may communicate with the luggage transportation vehicle via a network or some or all of the functions thereof may be provided in the luggage transportation vehicle. The management device generates movement schedule information, for example, on the basis of request information which is acquired from a terminal device of a user by communication. The management device informs the luggage transportation vehicle of a route or a stop position of the luggage transportation vehicle, an open/closed state of doors of the storage portions, and the like based on the movement schedule information.

In the following description, it is assumed that the management device is a device which is placed in a place which is different from that of the luggage transportation vehicle (for example, a device called a cloud server) and realizes the functions by communicating with a terminal device of a user or the luggage transportation vehicle via a network.

[Overall Configuration]

FIG. 1 is a diagram illustrating the configuration of the transportation system 1 including a luggage transportation vehicle 200. The transportation system 1 includes one or more luggage transportation vehicles 200 and a management device 300. The management device 300 communicates with a terminal device 100 which is used by a user U via a network NW. The network NW includes the Internet, a wide area network (WAN), a local area network (LAN), a public circuit line, a provider device, a dedicated circuit line, or a radio base station. The management device 300 communicates with the luggage transportation vehicle 200 via the network NW. A "terminal device of a user" is a terminal device which can be used by a plurality of unspecified persons such as a terminal device in an Internet café and may include a terminal device which is temporarily used by a user. In any case, "terminal device of a user" refers to, for example, a terminal device for which a user performing operation is specified by a login operation of inputting a password.

The user U transmits request information for requesting delivery of luggage P to the management device 300 using the terminal device 100. A label L in which identification information of the luggage P and/or the user U is described or which is stored in an embedded radio frequency identifier (RFID) tag or the like in the luggage P is allocated to the luggage P. "Allocated" means, for example, that it is attached by sealing. Identification information includes, for example, barcode information such as a one-dimensional code or a two-dimensional code such as a QR code (registered trademark).

Examples of the terminal device 100 include a smartphone, a tablet terminal, and a personal computer. In the terminal device 100, an application program, a browser, or the like which is used to use the service is started and supports the following service. In the following description, it is assumed that the terminal device 100 is a smartphone and an application program for receiving a service (a transportation service application) is started. The transportation service application communicates with the management device 300 in accordance with a user's operation and transmits request information from the user to the management device 300 or provides information based on information received from the management device 300. Request information is electronic information for requesting transportation of luggage P over a designated section using a luggage transportation vehicle 200.

[Luggage Transportation Vehicle]

The luggage transportation vehicle 200 includes, for example, a travel unit 210 that can travel autonomously on a road without a driver and a storage unit 250 that is detachably attached to the travel unit 210. The travel unit 210 travels autonomously on a road without a driver. The travel unit 210 includes a monitoring unit 212 including a sensor that detects information required for autonomous travel of the luggage transportation vehicle 200 such as a camera, a radar device, or a LIDAR, a battery 214 that supplies driving electric power of the travel unit 210, and a display device 216. The battery 214 is detachable from the travel unit 210. The battery 214 is an example of a "power supply unit." The display device 216 may have a touch panel function or may have a communication function with a noncontact IC card embedded therein.

Figure 2:
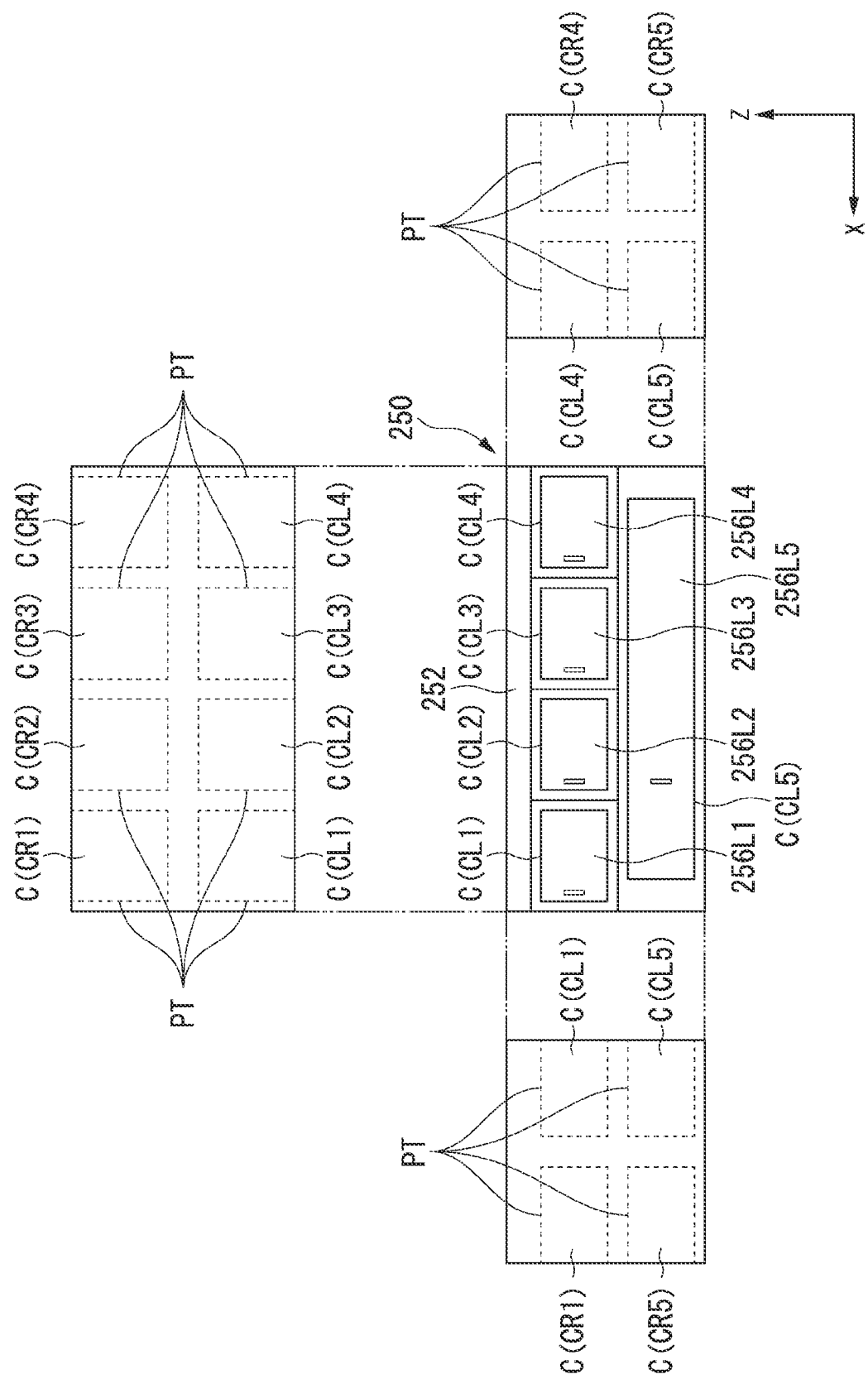
FIG. 2 is a diagram illustrating the appearance of a storage unit 250.

The storage unit 250 includes, for example, a storage unit C that is closed by a door portion which can be opened and closed and that can store luggage P and an opening/closing mechanism control unit 252 that controls opening/closing of the door portion of the storage portion C. The storage unit 250 includes a plurality of storage portions which are closed by the door portion which can be opened and closed and is detachably attached to the travel unit. FIG. 2 is a diagram illustrating the appearance of the storage unit 250. In this embodiment, it is assumed that the storage portions C include upper-left storage portions CL1, CL2, CL3, and CL4, upper-right storage portions CR1, CR2, CR3, and CR4, a lower-left storage portion CL5, and a lower-right storage portion CR5. The number of internal spaces (accommodation portions) in which luggage P can be stored and which are included in the storage portions C is arbitrary.

The upper-left storage portions CL1, CL2, CL3, and CL4 are arranged adjacent to each other in one direction. Each of the upper-left storage portions CL1, CL2, CL3, and CL4 includes an internal space (an accommodation portion) in which luggage P can be stored and an opening. The upper-left storage portions CL1, CL2, CL3, and CL4 are partitioned from each other by partitions PT.

The upper-right storage portions CR1, CR2, CR3, and CR4 are arranged adjacent to each other in one direction. The upper-left storage portions CL1, CL2, CL3, and CL4 and the upper-right storage portions CR1, CR2, CR3, and CR4 are arranged adjacent to each other in one direction. Each of the upper-right storage portions CR1, CR2, CR3, and CR4 includes an internal space (an accommodation portion) in which luggage P can be stored and an opening. The upper-right storage portions CR1, CR2, CR3, and CR4 are partitioned from each other by partitions PT.

The lower-left storage portion CL5 is disposed below the upper-left storage portions CL1, CL2, CL3, and CL4. In other words, the upper-left storage portions CL1, CL2, CL3, and CL4 and the lower-left storage portion CL5 are arranged vertically adjacent to each other. The lower-left storage portion CL5 includes an internal space (an accommodation portion) in which luggage P can be stored and an opening. The upper-left storage portions CL1, CL2, CL3, and CL4 are partitioned from the lower-left storage portion CL5 by a partition PT. For example, the internal space of the lower-left storage portion CL5 is larger than the internal space of each of the upper-left storage portions CL1, CL2, CL3, and CL4. An opening area of the opening of the lower-left storage portion CL5 is larger than an opening area of the opening of each of the upper-left storage portions CL1, CL2, CL3, and CL4. The lower-left storage portion CL5 is a storage portion in which relatively large luggage P or relatively heavy luggage P is stored.

The lower-right storage portion CR5 is disposed below the upper-right storage portions CR1, CR2, CR3, and CR4. In other words, the upper-right storage portions CR1, CR2, CR3, and CR4 and the lower-right storage portion CR5 are arranged vertically adjacent to each other. The lower-right storage portion CR5 includes an internal space (an accommodation portion) in which luggage P can be stored and an opening. The upper-right storage portions CR1, CR2, CR3, and CR4 are partitioned from the lower-right storage portion CR5 by a partition PT. For example, the internal space of the lower-right storage portion CR5 is larger than the internal space of each of the upper-right storage portions CR1, CR2, CR3, and CR4. An opening area of the opening of the lower-right storage portion CR5 is larger than an opening area of the opening of each of the upper-right storage portions CR1, CR2, CR3, and CR4. The lower-right storage portion CR5 is a storage portion in which relatively large luggage P or relatively heavy luggage P is stored.

In this embodiment, a plurality of door portions 256 include upper-left doors 256L1, 256L2, 256L3, and 256L4, upper-right doors 256R1, 256R2, 256R3, and 256R4 (not illustrated), a lower-left door 256L5, and a lower-right door 256R5 (not illustrated). These door portions 256 are pivotally supported by, for example, hinges which are not illustrated and can be opened to, for example, 90 degrees with respect to a closed position at which the opening of the storage portion C is closed. In other words, the opening/closing mechanism may include a stopper that regulates the door portion 256 such that it is not opened over 90 degrees with respect to the closed position. The upper-left doors 256L1, 256L2, 256L3, and 256L4 are provided in the openings of the upper-left storage portions CL1, CL2, CL3, and CL4 in one-to-one correspondence. The lower-left door 256L5 is provided in the opening of the lower-left storage portion CL5. The upper-right doors 256R1, 256R2, 256R3, and 256R4 are provided in the openings of the upper-right storage portions CR1, CR2, CR3, and CR4 in one-to-one correspondence. The lower-right door 256R5 is provided in the opening of the lower-right storage portion CR5. The plurality of door portions 256 are formed of, for example, a member allowing the inside to be visible from the outside of the storage unit 250. At least some of the plurality of door portions 256 are formed of, for example, a transparent material such as plastic or glass.

The storage unit 250 is attached to the travel unit 210 such that it does not affect opening/closing of the plurality of door portions 256 (does not hinder the opening/closing). For example, when the travel unit 210 includes a front structure extending in a vehicle height direction Z in front of the vehicle and a rear structure which is lower than the front structure and to which the storage unit 250 is attached in rear of the vehicle as illustrated in FIG. 1, the storage unit 250 is attached to the travel unit 210 such that the storage portion C includes a space extending in a vehicle width direction Y and the opening (the door portion 256) thereof faces the vehicle width direction Y of the travel unit 210. In other words, the storage unit 250 is attached to the travel unit 210 such that the upper-left storage portions CL1, CL2, CL3, and CL4 are arranged in a vehicle traveling direction X, the upper-left storage portions CL1, CL2, CL3, and CL4 and the lower-left storage portion CL5 are arranged in the vehicle height direction Z, and the openings of the upper-left storage portions CL1, CL2, CL3, and CL4 and the lower-left storage portion CL5 face the vehicle width direction Y. The storage unit 250 is attached to the travel unit 210 such that the upper-right storage portions CR1, CR2, CR3, and CR4 are arranged in the vehicle traveling direction X, the upper-right storage portions CR1, CR2, CR3, and CR4 and the lower-right storage portion CR5 are arranged in the vehicle height direction Z, and the openings of the upper-right storage portions CR1, CR2, CR3, and CR4 and the lower-right storage portion CR5 face the vehicle width direction −Y. By attaching the storage unit 250 in this way, opening/closing of the plurality of door portions 256 is not hindered.

That is, the storage unit 250 includes a first storage portion and a second storage portion which are partitioned from each other, and the door portions include a first door portion that is provided on a first surface of the storage unit 250 and that can open and close the first storage portion and a second door portion that is provided on a second surface opposite to the first surface of the storage unit 250 and that can open and close the second storage portion. The storage unit 250 is attached to the travel unit 210 such that opening/closing operations of the first door portion and the second door portion are not hindered.

Figure 3:
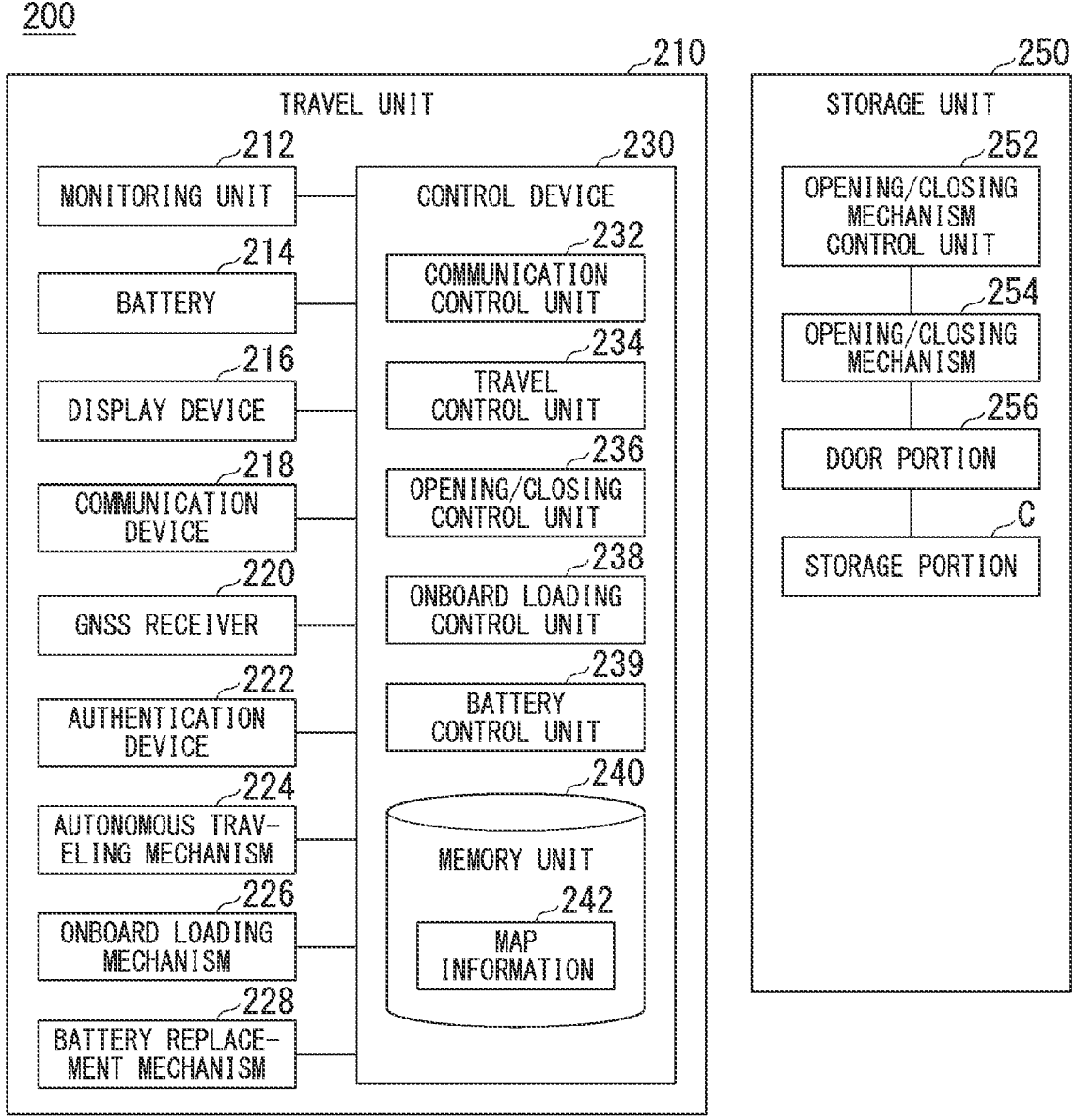
FIG. 3 is a diagram illustrating a configuration of a luggage transportation vehicle 200.

FIG. 3 is a diagram illustrating the configuration of the luggage transportation vehicle 200. The travel unit 210 of the luggage transportation vehicle 200 includes a communication device 218, a GNSS receiver 220, an authentication device 222, an autonomous traveling mechanism 224, an onboard loading mechanism 226, a battery replacement mechanism 228, and a control device 230 in addition to the monitoring unit 212, the battery 214, and the display device 216.

The communication device 218 is, for example, a radio communication module that accesses the network NW or communicates directly with another vehicle, a pedestrian's terminal device, or the like. The communication device 218 performs radio communication on the basis of a communication standard such as Wi-Fi, dedicated short-range communications (DSRC), or Bluetooth (registered trademark). A plurality of communication devices may be prepared as the communication device 218 according to a use.

The GNSS receiver 220 measures a position of the GNSS receiver (a position of the luggage transportation vehicle 200) on the basis of radio waves transmitted from GNSS satellites (for example, GPS satellites). The GNSS receiver 220 outputs the result of positioning to the control device 230.

The authentication device 222 is a device that ascertains whether a user who desires to load luggage P into the luggage transportation vehicle 200 is an authorized user (authenticates the user). An authorized user is a user who has made a contract (a reservation) for transportation of luggage with the management device 300. The authentication device 222 may be an arbitrary device such as a short-range radio communication device, a biometric authentication device, or a password input device as long it has an authentication function. The authentication device 222 outputs the result of authentication to the control device 230.

The autonomous traveling mechanism 224 includes wheels, a drive force source such as a motor, and a steering mechanism. The autonomous traveling mechanism 224 causes the luggage transportation vehicle 200 to move in an arbitrary direction in accordance with an instruction from the control device 230.

The onboard loading mechanism 226 loads the storage unit 250 in the travel unit 210 or unloads the storage unit 250 from the travel unit 210 in accordance with an instruction from the control device 230. The onboard loading mechanism 226 includes, for example, an arm portion (a fork) for lifting the storage unit 250 and a drive force source such as a motor for driving the arm portion. When the process of loading the storage unit 250 in the travel unit 210 is performed manually or using an external machine (for example, an unloading vehicle such as a forklift or a crane truck) by an operator, the onboard loading mechanism 226 may not be provided.

The battery replacement mechanism 228 performs a process of replacing or charging the battery 214 in accordance with an instruction from the control device 230. The battery replacement mechanism 228 replaces, for example, a used battery 214 with a decreased capacity with a charged battery 214. Alternatively, the battery replacement mechanism 228 connects, for example, the used battery 214 with a decreased capacity to a charging facility. The battery replacement mechanism 228 includes, for example, an arm portion for detaching/attaching the battery 214 and a drive force source such as a motor for driving the arm portion. When detachment/attachment of the battery 214 is performed manually or using an external device by an operator, the battery replacement mechanism 228 may not be provided.

The control device 230 includes, for example, a communication control unit 232, a travel control unit 234, an opening/closing control unit 236, an onboard loading control unit 238, a battery control unit 239, and a storage unit 240. The storage unit 240 stores map information 242. The storage unit 240 is realized by an HDD, a flash memory, a ROM, a random access memory (RAM), or the like. The battery control unit 239 is an example of a "power supply control unit."

The communication control unit 232 acquires information on a route from the management device 300 via the communication device 218 and outputs the acquired information on a route to the travel control unit 234. The communication control unit 232 uploads positional information indicating the position measured by the GNSS receiver 220 to the management device 300 using the communication device 218. Uploading of the positional information is periodically performed, for example, at intervals of several milliseconds to several seconds.

The travel control unit 234 controls the autonomous traveling mechanism 224 such that the luggage transportation vehicle 200 travels on a route designated by the management device 300. The travel control unit 234 matches the route acquired from the management device 300 with map information 242 and the output of the monitoring unit 212 and determines a detailed route on which the luggage transportation vehicle 200 has to travel. The travel control unit 234 causes the luggage transportation vehicle 200 to travel autonomously such that the luggage transportation vehicle 200 avoids contact with an object (including a guard rail or a curbstone) of which a position or a speed has been input from the monitoring unit 212 while traveling on the route in principle.

The travel control unit 234 stops the luggage transportation vehicle 200 when a stop instruction is acquired from the management device 300. Instead, when the information on a route includes information on a stop position, the travel control unit 234 may stop the luggage transportation vehicle 200 when the stop position matches the positioning result from the GNSS receiver 220. That is, a stop instruction or information on a stop position is transmitted from the management device 300 to the travel control unit 234, and the travel control unit 234 stops the luggage transportation vehicle 200 in response to the transmitted information. A position at which the luggage transportation vehicle 200 is stopped includes a position on a road. Particularly, in a situation in which a user U loads luggage P into the storage portion C of the luggage transportation vehicle 200, the luggage transportation vehicle 200 stops on a road, in a parking lot, or the like.

The opening/closing control unit 236 transmits a control signal for driving an opening/closing mechanism 254 to the opening/closing mechanism control unit 252 of the storage unit 250, for example, at a timing instructed from the management device 300.

The onboard loading control unit 238 transmits a control signal for loading the storage unit 250 into the travel unit 210 or unloading the storage unit 250 from the travel unit 210 to the onboard loading mechanism 226, for example, on the basis of an instruction from the management device 300.

The battery control unit 239 determines whether a capacity of the battery 214 is equal to or greater than (sufficient for) a capacity required for a delivery process. For example, the battery control unit 239 determines whether the capacity of the battery 214 is sufficient on the basis of whether a residual capacity of the battery 214 is equal to or greater than a predetermined threshold value. When it is determined that the capacity of the battery 214 is not equal to or greater than the capacity required for the delivery process, the battery control unit 239 transmits a control signal for replacing or charging the battery 214 to the battery replacement mechanism 228. When it is determined that the capacity of the battery 214 is equal to or greater than the capacity required for the delivery process, the battery control unit 239 does not perform the process of replacing or charging the battery 214.

The opening/closing mechanism control unit 252 of the storage unit 250 controls the opening/closing mechanism 254 on the basis of the control signal received from the opening/closing control unit 236.

The opening/closing mechanism 254 is provided for each door portion 256 and includes a motor or an arm. The opening/closing mechanism 254 individually opens and closes the door portions 256. For example, a switch for detecting that the corresponding door portion has been manually closed is attached to each door portion 256. A locking mechanism may be provided instead of (or in addition to) the opening/closing mechanism 254. In this case, the door portion of the storage portion C which is used by a user U is unlocked and the user U manually opens and closes the door portion 256.

[Management Device]

Figures 4, 5:
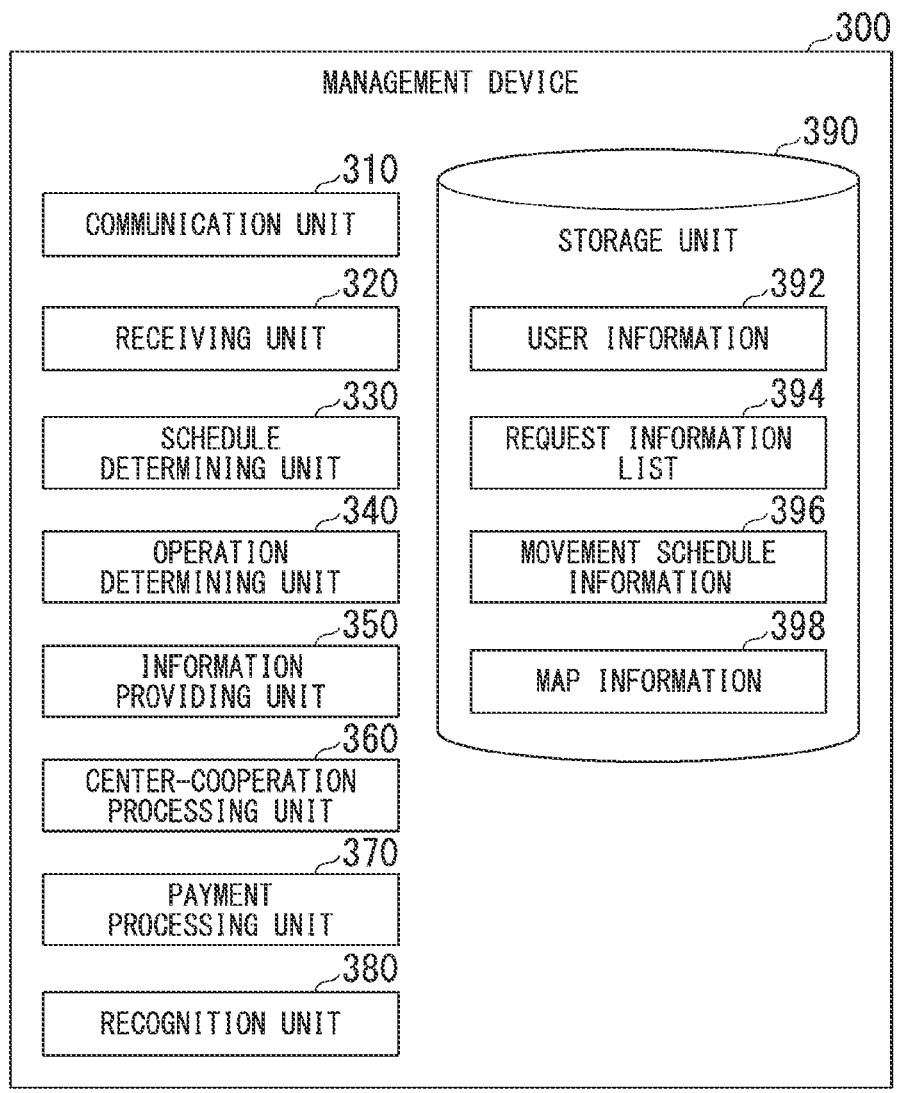
FIG. 4 is a diagram illustrating a configuration of a management device 300.
FIG. 5 is a diagram illustrating an example of details of user information 392.

FIG. 4 is a diagram illustrating the configuration of the management device 300. The management device 300 includes, for example, a communication unit 310, a receiving unit 320, a schedule determining unit 330, an operation determining unit 340, an information providing unit 350, a center-cooperation processing unit 360, a payment processing unit 370, a recognition unit 380, and a memory unit 390. The memory unit 390 is realized by a DVD, a RAM, a flash memory, or the like. The memory unit 390 stores user information 392, a request information list 394, movement schedule information 396, map information 398, and the like.

FIG. 5 is a diagram illustrating an example of details of the user information 392. In the user information 392, for example, communication identification information and information such as a name, a sex, an age, an address, and an occupation are correlated with a user ID which is identification information of a user. The fields of the user information 392 are registered in advance at the time of joining a service which is managed by the management device 300 or the like. The communication identification information is information required for transmitting information to the terminal device 100 and is information such as an application ID assigned to an application program, an internet protocol (IP) address, a media access control (MAC) address, and a mail address.

The communication unit 310 is a network card for accessing the network NW. The communication unit 310 communicates with a terminal device 100 or a luggage transportation vehicle 200 via the network NW The receiving unit 320 acquires (receives) request information transmitted from a terminal device 100 of a user via the communication unit 310 and adds the acquired request information to the request information list 394. FIG. 6 is a diagram illustrating an example of details of the request information list 394. The request information list 394 is, for example, information in which a user ID of a user having transmitted the request information, a luggage ID which is identification information of luggage, a carry-in point serving as a start point of a section and a carry-out point serving as an end point of a section associated with transportation of the luggage, a desired carry-in time, a luggage type, storage unit designation information, storage portion designation information, and the like are correlated with each other. A set of a user ID, a luggage ID, a carry-in point, a carry-out point, a desired carry-in time, and a luggage type which are associated with a piece of request information is referred to as a record. The luggage ID is assigned by the receiving unit 320. The request information is an arbitrary format of information including details required to generate one record. The storage unit designation information is information indicating what storage unit 250 is assigned. The storage portion designation information is information indicating what storage portion C is assigned. The request information list 394 is an example of a "delivery list."

The storage unit designation information and the storage portion designation information are determined, for example, by the schedule determining unit 330. When the storage unit designation information and the storage portion designation information are determined in response to the request information received from a user U, the schedule determining unit 330 transmits the determined details to the terminal device 100 of the user. The terminal device 100 displays information indicating the determined details. Accordingly, the user U can recognize the position of the storage portion C in the storage unit designation information in which luggage P is to be stored in advance.

When a record of new request information is added to the request information list 394, the schedule determining unit 330 selects a luggage transportation vehicle 200 to be provided for the user U associated with the request information out of a plurality of luggage transportation vehicles 200 with reference to a list (not illustrated) of the luggage transportation vehicles 200 and movement schedule information 396. For example, the schedule determining unit 330 narrows to a luggage transportation vehicle 200 which can transport the luggage P with reference to the luggage type included in the request information, then adds pickup of the luggage P to an existing movement schedule of the narrowed luggage transportation vehicle 200 in the movement schedule information 396 when pickup of the luggage P can be appropriately added to the existing movement schedule, and sets a movement schedule of a new luggage transportation vehicle 200 and registers pickup of the luggage P otherwise. The storage unit designation information and the storage portion designation information are determined as described above and are transmitted to the terminal device 100 of the user U.

FIG. 7 is a diagram illustrating an example of details of the movement schedule information 396. The movement schedule information 396 is set with a daily schedule as one unit for each luggage transportation vehicle 200. In the movement schedule information 396, a scheduled time, information indicating carry-in or carry-out, a luggage ID of luggage P which is transported, a carry-in or carry-out point, information of a route between points (for example, a route from a previous event to a current event), and the like are correlated with each storage portion C for an event in which carry-in or carry-out is performed (hereinafter also referred to as a carry-in event or a carry-out event). The route is expressed, for example, by sequentially arranging links in map information 398. For example, the schedule determining unit 330 roughly groups records of the request information on the basis of dates, time lines, and areas, sets some movement patterns in which a plurality of carry-in points and desired carry-in times are sequentially arranged, extracts a movement pattern with a lowest movement cost with reference to the map information 398, and adds the extracted movement pattern to the movement schedule information 396. The method of calculating or evaluating a movement cost can employ various known methods in the field of navigation systems and thus description thereof will be omitted.

The operation determining unit 340 transmits an operation instruction to the luggage transportation vehicle 200 using the communication unit 310 on the basis of the movement schedule information 396. That is, the operation determining unit 340 determines an operation of the luggage transportation vehicle 200 on the basis of the movement schedule information 396 which is generated on the basis of the request information received by the receiving unit 320. The operation of the luggage transportation vehicle 200 which is determined by the operation determining unit 340 includes a route, a stop instruction at a carry-in point or a carry-out point (a stop timing may be instructed or a point may be instructed and whether to stop may be determined by the luggage transportation vehicle 200), and details indicating what storage portion C is vacated in the carry-in point or the carry-out point and what storage unit 250 is to be loaded in the travel unit 210 in a luggage collection center 400. As illustrated in FIG. 7, the movement schedule information 396 is set for a storage portion C of which the storage portion designation information is "CL1" such that luggage P with a luggage ID of "A012" is carried in at Event(1), is transported, and carried out at Event(2), and then luggage P with a luggage ID of "A658" is carried in at Event(5).

The information providing unit 350 provides positional information or route information of the luggage transportation vehicle 200 to the terminal device 100 of the user U. The information providing unit 350 transmits positional information which is uploaded via the communication device 218 by the communication control unit 232 of the luggage transportation vehicle 200 or route information which is described in the movement schedule information 396 to the terminal device 100 via the communication unit 310. The information providing unit 350 transmits, for example, information for displaying an image indicating the positional information or the route information to overlap a map image to the terminal device 100.

The center-cooperation processing unit 360 performs a process of cooperating with the luggage collection center 400. The luggage collection center 400 is provided for each of areas which are arbitrarily divided. A luggage transportation vehicle 200 may complete operations from pickup to delivery in one area without passing through the luggage collection center 400. When delivery to the outside of the corresponding area is designated, the luggage transportation vehicle 200 delivers luggage P to the luggage collection center 400 and carries out the luggage P there. The luggage P is transported, for example, by a large-scale transportation means such as a large truck or a railroad between the luggage collection center 400 and a luggage collection center 400. In a luggage collection center 400 of a transportation destination, the luggage P is carried in a luggage transportation vehicle 200 and is transported to a delivery destination. When the luggage transportation vehicle 200 has arrived at the delivery destination but delivery of luggage has not been completed for a reason such as absence of a user U who is a recipient and delivery after the day (such as re-delivery) of the luggage has been determined, the luggage transportation vehicle 200 transports the luggage to the luggage collection center 400 to temporarily the luggage in the luggage collection center 400. In this case, the luggage P is carried in a luggage transportation vehicle 200 in the luggage collection center 400 at a scheduled delivery date and is transported to the delivery destination.

The payment processing unit 370 performs a process of collecting a fee from a user U. For example, the payment processing unit 370 collects a fee from a user U in cooperation with a management server of a credit card or electronic money.

The recognition unit 380 recognizes what luggage is stored in what storage portion C of what storage unit 250 on the basis of the result of recognition from an authentication device at the time of loading luggage in the luggage collection center. Details of the process which is performed by the recognition unit 380 will be described later.

The functional units of the control device 230 of the travel unit 210, the opening/closing mechanism control unit 252 of the storage unit 250, and the functional units of the management device 300 are realized, for example, by causing a hardware processor such as a central processing unit (CPU) to execute a program (software). Some or all of the functional units may be realized by hardware (including circuitry) such as a large scale integration (LSI), an application-specific integrated circuit (ASIC), a field-programmable gate array (FPGA), or a graphics processing unit (GPU) or may be realized by combination of software and hardware. The program may be stored in a memory device (a memory device including a non-transitory storage medium) such as a hard disk drive (HDD) or a flash memory in advance or may be stored in a removable storage medium (a non-transitory storage medium) such as a DCD or a CD-ROM and installed in the memory device by setting the storage medium to the drive device.

[Onboard Loading Process of Storage Unit in Luggage Collection Center]

As described above, when delivery of luggage to the outside of an area has been designated or when delivery of luggage P has not been completed for a reason such as absence of a user U who is a recipient and delivery after the day (such as re-delivery) of the luggage has been determined, the luggage P is collected in the luggage collection center 400. In the luggage collection center 400, the movement schedules are reviewed on the basis of information of delivery destinations of the collected luggage P and the luggage P is loaded into the luggage transportation vehicles 200 on the basis of the reviewed movement schedule.

In this embodiment, in order to accurately and rapidly perform the luggage loading process, an operator performs a process of loading luggage P into an empty storage unit 250 disposed in the luggage collection center 400 (a storage unit 250 detached from the travel unit 210) and loading the loaded storage unit 250 into the travel unit 210 which will perform delivery from now.

Figure 8:
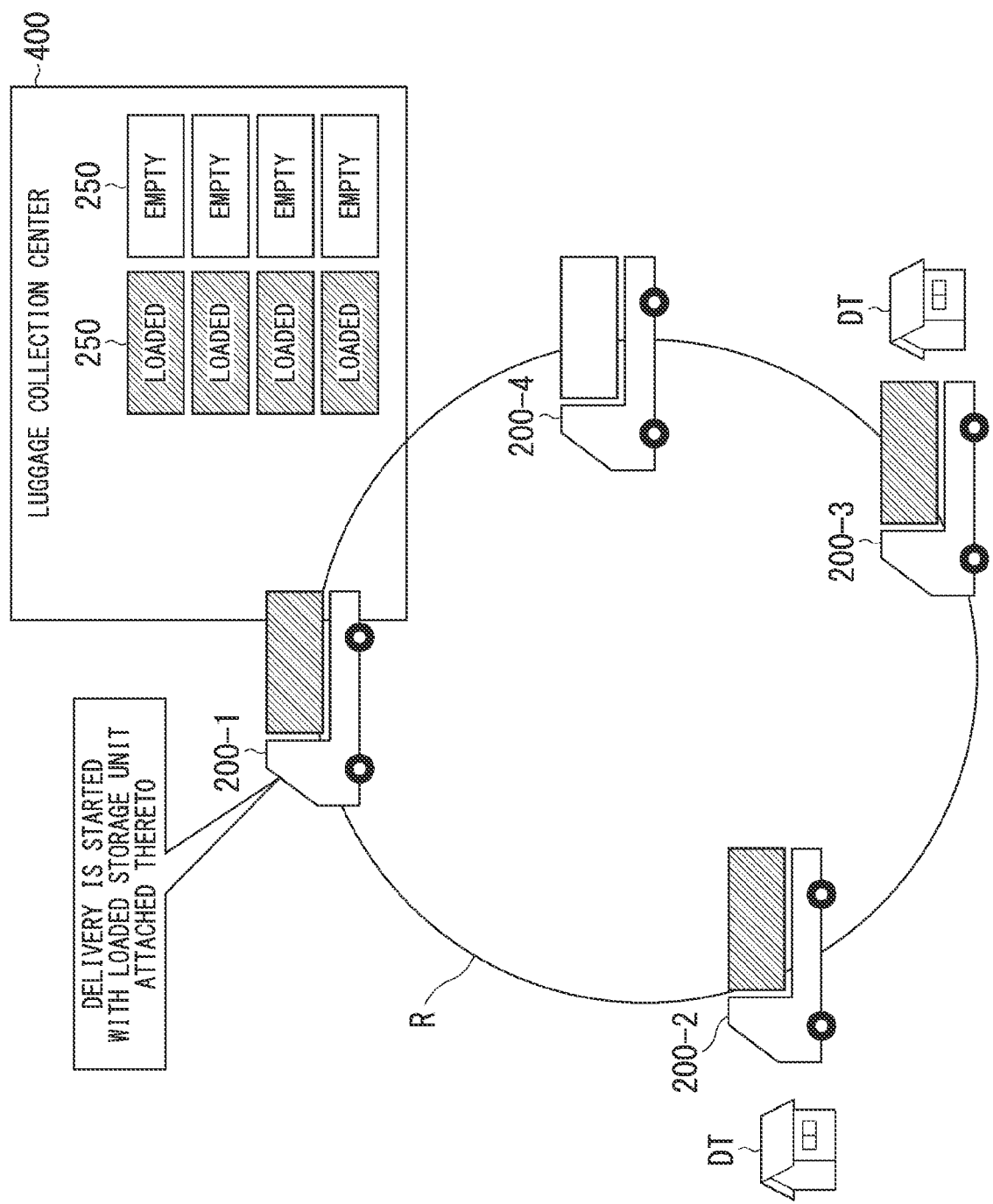
FIG. 8 is a diagram illustrating an example of a loading process in a luggage collection center 400.

FIG. 8 is a diagram illustrating an example of a luggage loading process. As illustrated in FIG. 8, for example, at a delivery start time point of one day, a luggage transportation vehicle 200 (200-1) loads a storage unit 250 with loaded luggage P into the travel unit 210 and starts delivery according to a movement schedule. Then, luggage transportation vehicles 200 (200-2 and 200-3) deliver the luggage P to a delivery destination DT. After the delivery process, a luggage transportation vehicle 200 (200-4) in which all or some of the storage portions C of the storage unit 250 are empty returns to the luggage collection center 400, unloads the storage unit 250 from the travel unit 210, loads another loaded storage unit 250 into the travel unit 210, and performs delivery of luggage P again.

Figure 9:
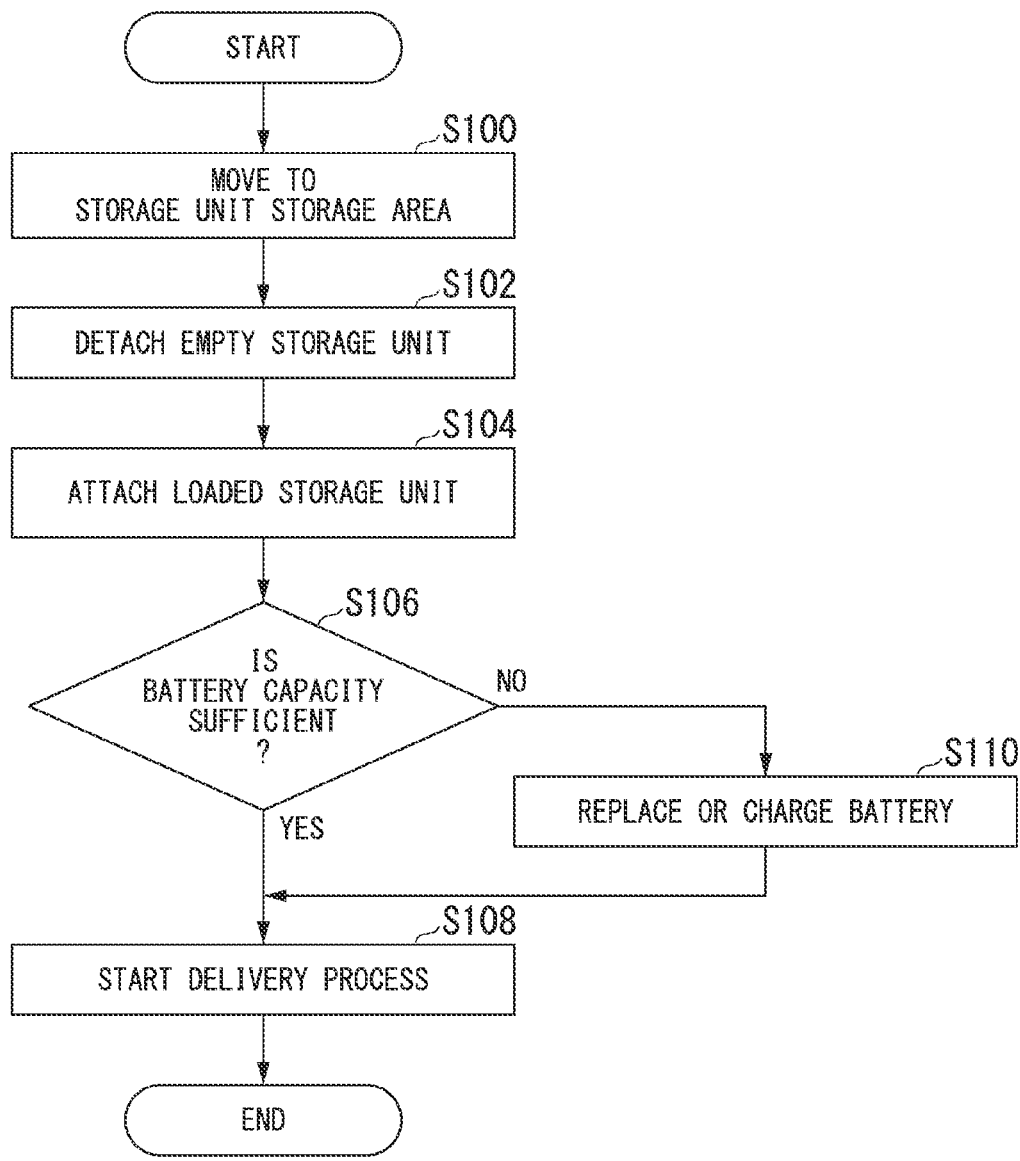
FIG. 9 is a flowchart illustrating an example of a flow of an onboard loading process in a storage unit 250.

FIG. 9 is a flowchart illustrating an example of a flow of an onboard loading process of a storage unit 250. First, the travel control unit 234 of the travel unit 210 controls the autonomous traveling mechanism 224 such that the luggage transportation vehicle 200 moves, for example, to a predetermined storage unit collection area in a luggage collection center 400 (Step S100).

Then, the onboard loading control unit 238 controls the onboard loading mechanism 226 such that an empty storage unit 250 is unloaded from the travel unit 210 (Step S102). The storage unit 250 is not necessarily empty and luggage P which has not been delivered may be left in some storage portions C. When a storage unit 250 is not loaded into the travel unit 210 at a delivery start time point of one day or the like, Step S102 is skipped. The process of unloading an empty storage unit 250 may be performed on the basis of an operator's operation by an unloading vehicle such as a forklift or an external device such as a crane truck.

Then, the onboard loading control unit 238 controls the onboard loading mechanism 226 on the basis of an instruction from the management device 300 and loads the loaded storage unit 250 into the travel unit 210 (Step S104). The onboard loading control unit 238 controls the onboard loading mechanism 226 such that a storage unit 250 indicated by the management device 300 out of a plurality of storage units 250 with loaded luggage disposed in advance in the luggage collection center 400 is loaded into the travel unit 210.

Then, the battery control unit 239 determines whether the capacity of the battery 214 is sufficient (Step S106). For example, the battery control unit 239 determines whether the capacity of the battery 214 is sufficient for performing a subsequent delivery process on the basis of whether a residual capacity of the battery 214 is equal to or greater than a predetermined threshold value. When it is determined that the capacity of the battery 214 is not sufficient, the battery control unit 239 controls the battery replacement mechanism 228 such that the mounted battery 214 is replaced with a charged battery 214 stored in the luggage collection center 400 or the mounted battery 214 is charged (Step S110).

When the battery control unit 239 has determined that the capacity of the battery 214 is sufficient or when replacement or charging of the mounted battery 214 has been completed, the travel control unit 234 controls the autonomous traveling mechanism 224 such that the delivery process is started for the luggage transportation vehicle 200 to travel on a route designated by the management device 300 (Step S108). Through these processes, the flow of processes of the flowchart ends.

[Process of Loading Luggage into Storage Unit in Luggage Collection Center]

As described above, luggage collected in the luggage collection center 400 is classified for areas of delivery destinations, for example, in accordance with a delivery instruction statement and is loaded into storage portions C of a storage unit 250 detached from the travel unit 210 by an operator's manual operation. The delivery instruction statement includes information of one or more pieces of luggage of which delivery destinations are in a predetermined area (nearby delivery destinations). An operator can understand what luggage should be collectively loaded into one storage unit 250 (one luggage transportation vehicle 200) in accordance with the delivery instruction statement. In this embodiment, the luggage loading process is performed in the following order.

<Luggage Loading Process Using Imaging Device>

In a luggage loading process using an imaging device, after loading of at least one piece of luggage P classified into areas of delivery destinations into a storage unit 250 by an operator's manual operation has been completed in accordance with a delivery instruction statement, luggage P and a storage portion C in which the luggage P is stored are recognized in correlation with each other by imaging a surface on which the door portions 256 of the loaded storage unit 250 are arranged using an imaging device. In this luggage loading process, an operator has only to load one or more pieces of luggage P classified into each area of a delivery destination into one specific storage unit 250 and does not need to be aware what luggage P is loaded into what storage unit C. The imaging device is an example of a "recognition device."

Figure 10:
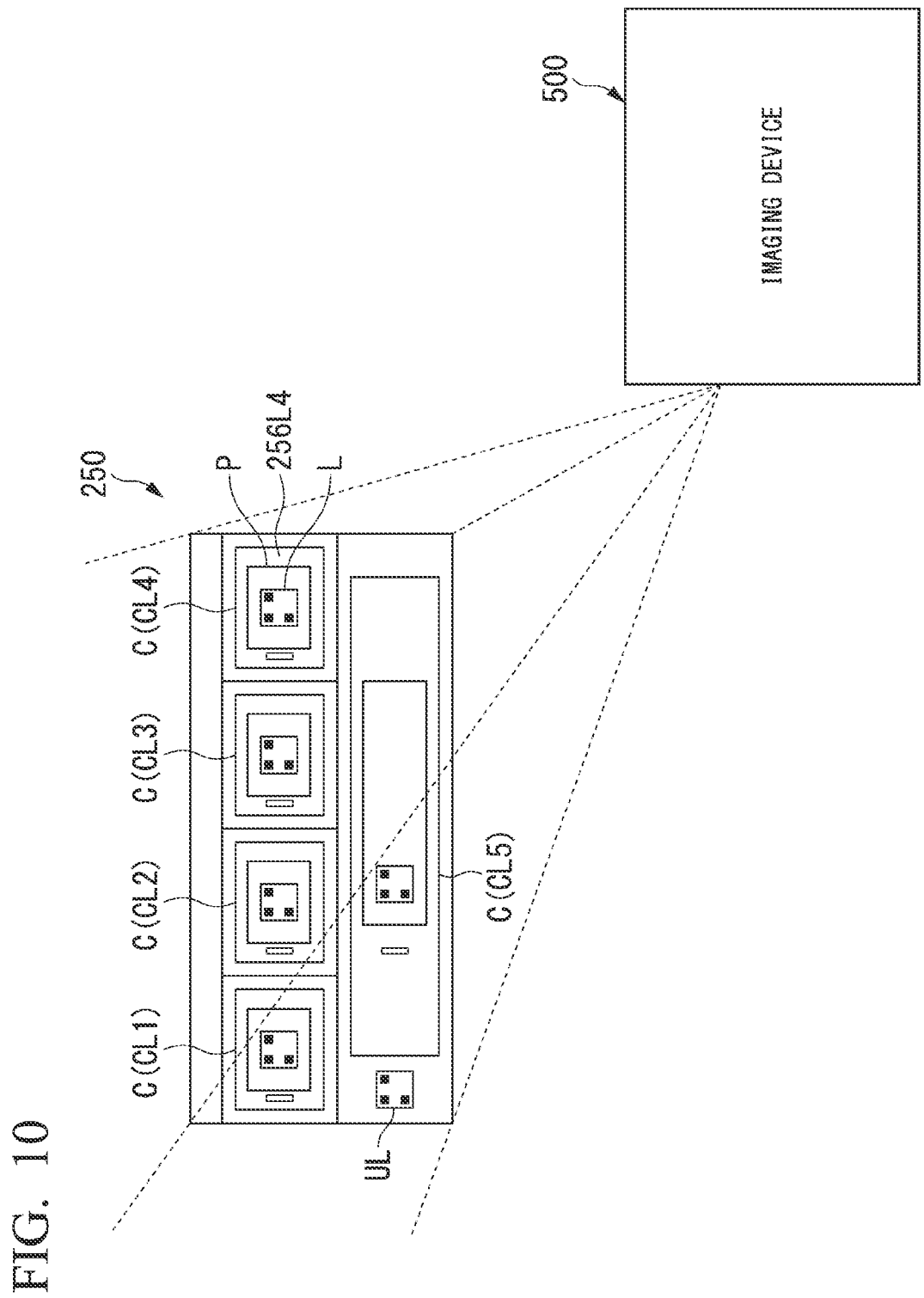
FIG. 10 is a diagram illustrating an example in which the storage unit 250 with loaded luggage is imaged by an imaging device 500.

FIG. 10 is a diagram illustrating an example in which a loaded storage unit 250 is imaged by an imaging device 500. As illustrated in FIG. 10, luggage P with a label L allocated thereto is stored in each storage portion C of the storage unit 250. The luggage P is disposed such that the label L can be recognized from the outside of the storage unit 250 (that is, can be imaged by the imaging device 500) in a state in which the luggage P is stored in the storage portion C. In other words, the label L is attached to a position which can be recognized from the outside of the storage unit 250 in a state in which the luggage is stored in the storage portion C. For example, luggage P is stored in a storage portion CL4 such that the label L can be recognized from the outside via the upper-left door 256L4 of which at least a part is formed of a transparent material. A label UL including identification information of the storage unit 250 is assigned to the storage unit 250.

The imaging device 500 images the storage unit 250 in a state in which the labels L of the luggage P and the label UL of the storage unit 250 can be recognized. The imaging device 500 transmits imaging data (imaging information) to the management device 300. The management device 300 recognizes the luggage P and the storage portion C in which the luggage P is stored on the basis of the label L and the label UL included in the received imaging information, updates the request information list 394, and updates or newly generates the movement schedule information 396.

Figure 11:
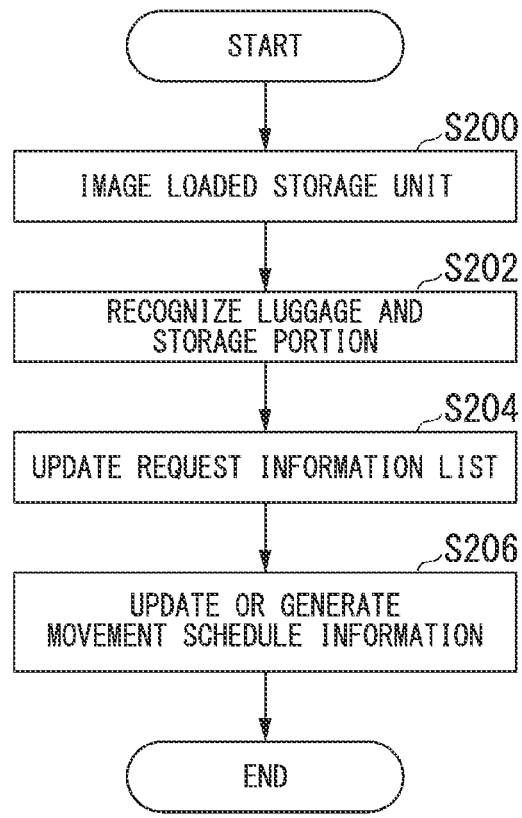
FIG. 11 is a flowchart illustrating an example of a flow of a loading process using the imaging device 500.

FIG. 11 is a flowchart illustrating an example of a flow of the luggage loading process using the imaging device 500. First, the loaded storage unit 250 is imaged by the imaging device 500 (Step S200). The imaging device 500 is fixed to a predetermined position close to an area in which the luggage loading operation is performed in the luggage collection center 400 and performs imaging on the basis of an operator's instruction. The imaging device 500 may be a portable type which is carried by an operator and imaging may be performed on the basis of an operator's imaging operation. The imaging device 500 may be provided in a luggage transportation vehicle 200. Imaging information acquired by the imaging device 500 is transmitted to the management device 300.

The recognition unit 380 of the management device 300 recognizes luggage P and a storage unit 250 and a storage portion in which the luggage P is stored on the basis of imaging information (a captured image) transmitted from the imaging device 500 (Step S202). For example, the recognition unit 380 recognizes the storage unit 250 to be imaged on the basis of the label UL of the storage unit 250 included in the imaging information. The recognition unit 380 recognizes the stored luggage P on the basis of the label L of the luggage P. The recognition unit 380 recognizes in what storage portion C the luggage P is stored by comparing a storage position of the luggage P recognized on the basis of the label L of the luggage P included in the captured image with reference information of the storage portions C (information such as the positions, the number, and the sizes of the storage portions) of the storage unit 250 which is stored in advance. Accordingly, the recognition unit 380 can recognize what luggage P is stored in what storage portion C of what storage unit 250.

Instead of or in addition to the label UL including identification information of the storage unit 250, labels for identifying the storage portions C (including identification information of both the storage unit 250 and the storage portions C) may be assigned to the door portions 256 and the labels for identifying the storage portions C may be imaged by the imaging device 500. In this case, the recognition unit 380 can recognize what luggage P is stored in what storage portion C of what storage unit 250 on the basis of the labels assigned to the door portions 256 and included in the imaging information and the labels L of the luggage P.

Instead of the label UL including the identification information of the storage unit 250, a label stored in an RFID tag or the like including the identification information of the storage unit 250 may be assigned to the storage unit 250, read by a sensor which is not illustrated, and transmitted to the management device 300. In this case, first, the recognition unit 380 recognizes the storage unit 250 on the basis of a detected value of the RFID tag received from the sensor. The recognition unit 380 recognizes the stored luggage P on the basis of the label L of the luggage included in the imaging information. The recognition unit 380 recognizes in what storage portion C the luggage P is stored by comparing a storage position of the luggage P based on the label L of the luggage P included in the captured image with reference information of the storage portions C (information such as the positions, the number, and the sizes of the storage portions) of the recognized storage unit 250 which is stored in advance. An operator who has loaded the luggage P may input the identification information of the storage unit 250 by operating an input interface of a terminal device (not illustrated) such that the identification information is transmitted from the terminal device to the management device 300.

Then, the recognition unit 380 updates the request information list 394 on the basis of the recognized luggage P, the recognized storage unit 250, and the recognized storage portions C (Step S204). For example, in the request information list 394 illustrated in FIG. 6, the recognition unit 380 updates the "storage unit designation information" and the "storage portion designation information" correlated with the recognized luggage P (the luggage ID) with information of storage unit and a storage portion which are newly recognized. Accordingly, the management device 300 can recognize what luggage P is stored in what storage portion C of what storage unit 250.

Then, the schedule determining unit 330 updates or newly generates the movement schedule information 396 on the basis of the updated request information list 394 (Step S206). Through the aforementioned processes, the flow of processes of the flowchart ends.

<Luggage Loading Process Using Sensor>

In a luggage loading process using a sensor, luggage P and a storage portion C in which the luggage P is stored are correlated with each other using a sensor provided in each storage portion C of the storage unit 250 and tag information (for example, an RFID tag) for identifying luggage P which is assigned to the luggage P. That is, an operator loads luggage P classified for each area of a delivery destination into the storage unit 250 in accordance with a delivery instruction statement, whereby luggage P and the storage portion C are automatically correlated. The sensor is an example of a "recognition device."

Figure 12:
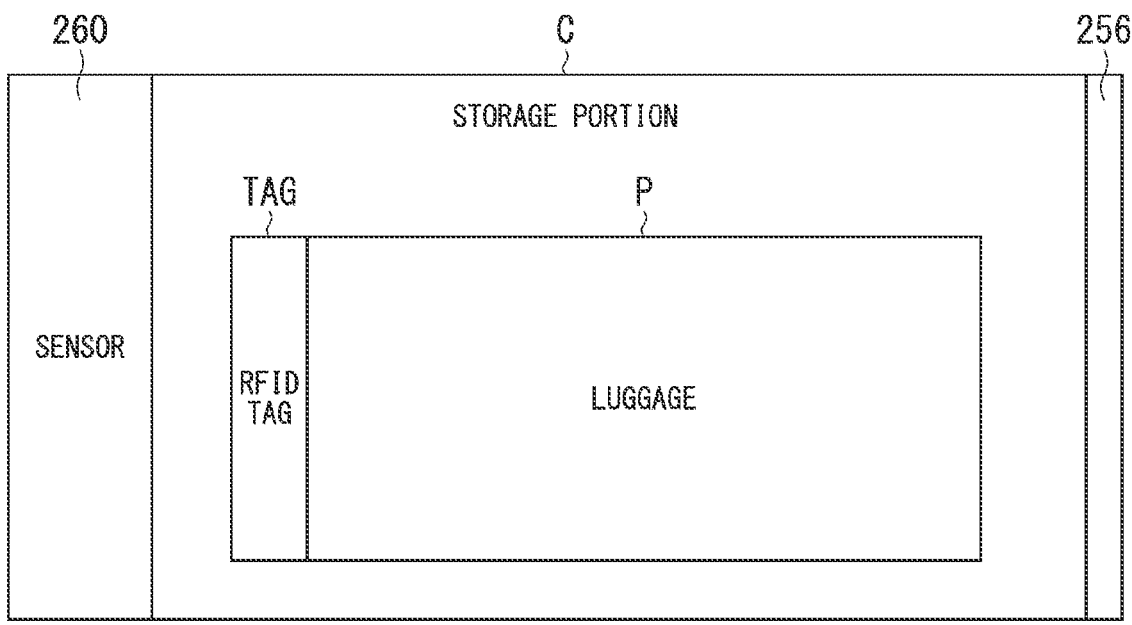
FIG. 12 is a sectional view of a storage portion C of the storage unit 250.

FIG. 12 is a sectional view of a storage portion C of a storage unit 250. As illustrated in FIG. 12, a sensor 260 is provided in each storage portion C. The sensor 260 detects information on an RFID tag assigned to luggage P stored in the storage portion C. The sensor 260 transmits the detected tag information of the RFID tag (that is, a luggage ID which is the identification information of the luggage P) to the management device 300. The management device 300 correlates luggage P and the storage portion C in which the luggage P is stored on the basis of the received tag information, updates the request information list 394, and updates or newly generates the movement schedule information 396.

Figure 13:
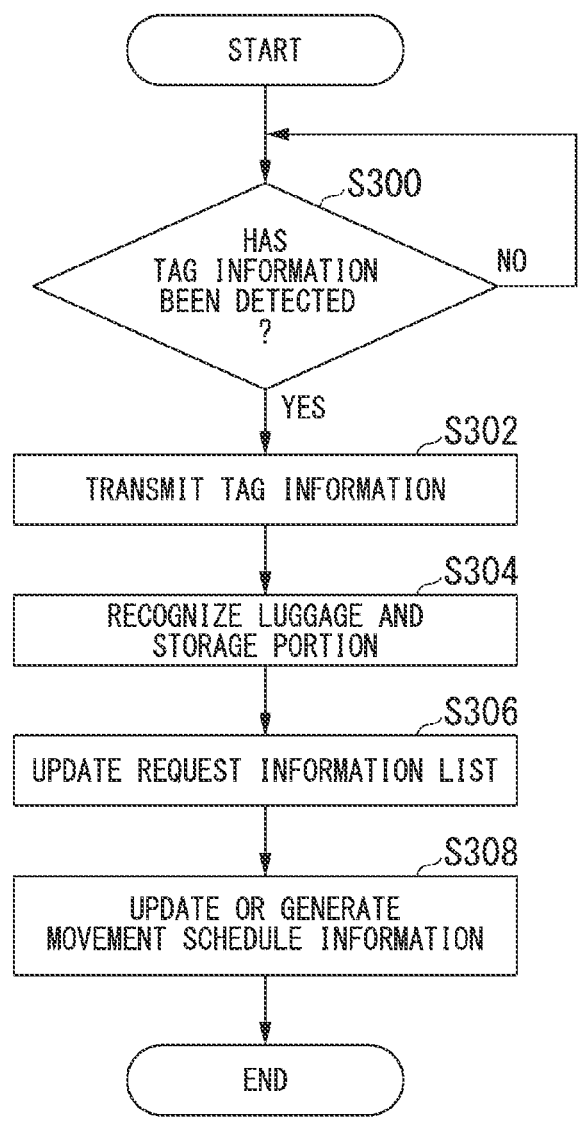
FIG. 13 is a flowchart illustrating an example of a flow of a loading process using a sensor 260.

FIG. 13 is a flowchart illustrating an example of a flow of the luggage loading process using the sensor 260. First, it is determined whether the sensor 260 has detected tag information (that is, whether luggage P is stored in the storage portion C) (Step S300). When it is determined that the sensor 260 has not detected tag information (that luggage P is not stored in the storage portion C), the determination is successively performed.

On the other hand, when it is determined that the sensor 260 has detected tag information (that luggage P is stored in the storage portion C), the sensor 260 transmits the detected tag information to the management device 300 (Step S302). This tag information includes information for identifying the storage unit 250 in which the sensor 260 is provided and information for identifying the storage portion C in addition to the identification information of the luggage P.

Then, the recognition unit 380 of the management device 300 recognizes luggage P and the storage unit 250 and the storage portion C in which the luggage P is stored on the basis of the tag information received from the sensor 260 (Step S304).

Then, the recognition unit 380 updates the request information list 394 on the basis of the recognized luggage P, the recognized storage unit 250, and the recognized storage portion C (Step S306). For example, the recognition unit 380 updates the "storage unit designation information" and the "storage portion designation information" correlated with the recognized luggage P (the luggage ID) in the request information list 394 illustrated in FIG. 6 with information of a storage unit and a storage portion which are newly recognized. Accordingly, the management device 300 can recognize what luggage P is stored in what storage portion C of what storage unit 250.

Then, the schedule determining unit 330 updates or newly generates the movement schedule information 396 on the basis of the updated request information list 394 (Step S308). Through the aforementioned processes, the flow of processes of the flowchart ends.

<Luggage Loading Process Using Identification Information of Luggage>

In a luggage loading process using identification information of luggage, an operator causes a sensor provided in a storage unit 250 to read identification information (for example, a QR code (registered trademark) or an RFID tag) assigned to luggage P and stores luggage P in the designated storage portion C. For example, when the operator causes the sensor to read identification information of luggage P in accordance with a delivery instruction statement, one door portion 256 of the storage unit 250 is opened under the control of the opening/closing control unit 236 of the travel unit 210 and the opening/closing mechanism control unit 252 of the storage unit 250. The operator stores luggage P in the storage portion C which becomes storable by opening the door portion 256.

According to the aforementioned embodiment, it is possible to enhance efficiency of a delivery operation. Since a storage unit 250 in which luggage P is stored in a plurality of storage portions C is attached to the travel unit 210, it is possible to accurately and rapidly load luggage into a luggage transportation vehicle 200. Since luggage P is stored in the storage portions C in accordance with a delivery instruction statement, it is possible to accurately and rapidly perform a storage operation.

While an embodiment of the invention has been described above, the invention is not limited to the embodiment and can be subjected to various modifications and replacements without departing from the gist of the invention.

What is claimed is:

1. An unmanned delivery machine comprising:
    a vehicle body that travels autonomously on a road without a driver;
    a storage device that includes a plurality of storage portions which are closed by a door portion which is able to be opened and closed and that is detachably attached to the vehicle body,
    wherein the storage device in which luggage is stored in the plurality of storage portions is attached to the vehicle body,
    wherein the storage device includes a first storage portion and a second storage portion which are partitioned from each other,
    wherein the door portion includes a first door portion that is provided on a first surface of the storage device and is able to open and close the first storage portion and a second door portion that is provided on a second surface opposite to the first surface of the storage device and is able to open and close the second storage portion, and
    wherein the vehicle body is able to be stopped at a carry-in point and a carry-out point designated by a user of the unmanned delivery machine.

2. The unmanned delivery machine according to claim 1, wherein the vehicle body includes:
    a travel control unit configured to control autonomous travel of the vehicle body; and
    a sensor configured to detect information which is required for autonomous travel of the vehicle body.

3. The unmanned delivery machine according to claim 1, wherein the storage device includes an opening/closing mechanism control unit configured to control an opening/closing mechanism of the door portion.

4. The unmanned delivery machine according to claim 1, wherein the storage device is attached to the vehicle body such that opening/closing operations of the first door portion and the second door portion are not hindered.

5. The unmanned delivery machine according to claim 1, wherein the vehicle body further includes:
    a power supply unit that supplies driving electric power for autonomous travel of the vehicle body and is able to be detached from the vehicle body; and
    a power supply control unit configured to determine whether a capacity of the power supply unit is equal to or greater than a capacity required for a delivery process, and
    wherein the power supply control unit does not perform a process of replacing or charging the power supply unit when it is determined that the capacity of the power supply unit is equal to or greater than the capacity required for the delivery process.

6. The unmanned delivery machine according to claim 5, wherein the power supply control unit performs the process of replacing or charging the power supply unit when it is determined that the capacity of the power supply unit is not equal to or greater than the capacity required for the delivery process.

7. The unmanned delivery machine according to claim 1, wherein the storage device is detached from the vehicle body after the delivery process has been completed and another storage device with other loaded luggage is attached to the vehicle body.

8. The unmanned delivery machine according to claim 1, wherein a process of attaching the storage device is performed in a luggage collection center.

9. The unmanned delivery machine according to claim 8, wherein a storage device which is instructed by a management device that manages an operation of the unmanned delivery machine out of a plurality of storage devices with loaded luggage which are disposed in advance in the luggage collection center is attached to the vehicle body.

* * * * *